United States Patent
Xie et al.

(10) Patent No.: US 9,841,834 B2
(45) Date of Patent: Dec. 12, 2017

(54) IN-CELL TOUCH LIQUID CRYSTAL PANELS AND THE ARRAY SUBSTRATES THEREOF

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Jianxing Xie, Guangdong (CN); Yao-li Huang, Guangdong (CN); Chun-hung Huang, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 246 days.

(21) Appl. No.: 14/891,371

(22) PCT Filed: Oct. 12, 2015

(86) PCT No.: PCT/CN2015/091770
§ 371 (c)(1),
(2) Date: Nov. 16, 2015

(87) PCT Pub. No.: WO2017/049674
PCT Pub. Date: Mar. 30, 2017

(65) Prior Publication Data
US 2017/0255306 A1    Sep. 7, 2017

(30) Foreign Application Priority Data
Sep. 25, 2015 (CN) .......................... 2015 1 0624607

(51) Int. Cl.
*G02F 1/1335* (2006.01)
*G06F 3/041* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ...... G06F 3/0412; G06F 3/0416; G06F 3/044; G06F 2203/04111; G02F 1/133345;
(Continued)

(56) References Cited

U.S. PATENT DOCUMENTS

| | | | |
|---|---|---|---|
| 2016/0117031 A1* | 4/2016 | Han | G06F 3/0412 345/174 |
| 2016/0179252 A1* | 6/2016 | Chang | G06F 3/0412 345/174 |

(Continued)

*Primary Examiner* — Nathanael R Briggs
(74) *Attorney, Agent, or Firm* — Andrew C. Cheng

(57) ABSTRACT

An in-cell touch liquid crystal panel and the array substrate are disclosed. The array substrate includes a glass substrate and a TFT, a common electrode layer, and a pixel electrode formed on the glass substrate. The common electrode layer includes a plurality of bar-shaped touch driving electrodes insulated from each other. Each of the touch driving electrodes includes a plurality of suspended electrodes. A second insulation layer and a metal wiring layer are arranged between the common electrode layer and the passivation layer in sequence. The metal wiring layer includes a plurality of driving electrode wirings, a plurality of suspended electrode wirings, and a plurality of touch sensing electrodes. Each of the driving electrode wirings electrically connects to one of the touch driving electrodes via the through holes on the insulation layer, and each of the suspended electrode wirings electrically connects to the suspended electrodes arranged along the second direction.

20 Claims, 5 Drawing Sheets

(51) Int. Cl.
*G02F 1/1333* (2006.01)
*G02F 1/1368* (2006.01)
*G02F 1/1362* (2006.01)
*G02F 1/1343* (2006.01)
*G06F 3/044* (2006.01)

(52) U.S. Cl.
CPC .. *G02F 1/133345* (2013.01); *G02F 1/133514* (2013.01); *G02F 1/134309* (2013.01); *G02F 1/136227* (2013.01); *G02F 1/136286* (2013.01); *G06F 3/044* (2013.01); *G06F 3/0416* (2013.01); *G02F 2001/133302* (2013.01); *G02F 2001/136295* (2013.01); *G02F 2201/121* (2013.01); *G02F 2201/123* (2013.01); *G06F 2203/04111* (2013.01)

(58) Field of Classification Search
CPC ........... G02F 1/13338; G02F 1/133514; G02F 1/134309; G02F 1/136227; G02F 1/136286; G02F 1/1368; G02F 2001/133302; G02F 2001/136295; G02F 2001/134318; G02F 2201/121; G02F 2201/123
See application file for complete search history.

(56) References Cited

U.S. PATENT DOCUMENTS

2016/0291790 A1* 10/2016 Yao ................... G06F 3/0418
2016/0357337 A1* 12/2016 Li ...................... G06F 3/044

* cited by examiner

IN-CELL TOUCH LIQUID CRYSTAL PANELS AND THE ARRAY SUBSTRATES THEREOF

BACKGROUND OF THE INVENTION

1. Field of the Invention

The present disclosure relates to touch technology, and more particularly to an in-cell touch liquid crystal panel and the array substrate thereof.

2. Discussion of the Related Art

Touch display panel is one input media providing a simple and convenient man-machine interaction. Thus, the touch display panel has been widely adopted in a variety of electronic devices. Basing on different operations principles and the medias for transmitting information, the touch-related products may include infrared touch panels, capacitive touch panels, resistive touch panels and surface acoustic wave touch panels. The capacitive touch panels are the mainstream products due to the attributes, such as long life cycle, high light transmission rate, and providing multi-touch.

The capacitive touch displays include capacitive touch panels, which may include surface capacitive and projected capacitive. The projected capacitive may be further classified into self-capacitance touch screens and mutual-capacitive touch screens. With respect to the mutual-capacitive touch screens, touch driving electrodes and touch sensing electrodes are configured on a surface of the glass. Coupling capacitance is formed at the intersection of the two electrodes. When fingers touch the capacitance screen, the coupling between the two electrodes of the touch point is changed, such that the coupling capacitance between the two electrodes is changed. A coordinate of each of the touch points may be calculated in accordance with the changed capacitance.

With respect to the mutual-capacitive in-cell touch panels, usually, the touch driving electrode (Tx) and the touch sensing electrode (Rx) are configured directly on the array substrate or the optical filter substrate. FIG. 1 is a schematic view of the conventional mutual-capacitive in-cell touch panel. Within the display area (AA), the touch driving electrode (Tx) and the touch sensing electrode (Rx) are respectively manufactured by two layers of ITO material. The touch driving electrode (Tx) and the touch sensing electrode (Rx) are arranged on two planes, which are non-coplanar, and the two planes are electrically insulated. This configuration is referred to as double-layers ITO mutual-capacitance screen, namely, double layer ITO touch screen (DITO). A plurality of bar-shaped touch driving electrode (Tx) are arranged along the Y-direction, and a plurality of bar-shaped touch sensing electrode (Rx) are arranged along the X-direction, wherein the X-direction is orthogonal to the Y-direction. The connection wirings 2 of the touch sensing electrode (Rx) may connect a down section of the display area (AA) with the touch control chip 1. The connection wiring 3 of the touch driving electrode (Tx) are configured to route from the left and the right side of the display area (AA), and then extend along the Y-direction to connect to the touch control chip 1. Thus, wiring areas 4 are at the left and right sides of the display area (AA).

Within the competitive display markets, differential designs is a key direction for improving unique selling points of the suppliers. Currently, the main trends include slim type and narrow border type. Such trends lead to artistic outlook and may draw consumer's focus. Nevertheless, as shown, the wiring area 4 occupies a certain space of the mutual-capacitive in-cell touch panels, and thus is adverse to the narrow-border design.

SUMMARY

In over to overcome the above-mentioned problem, the in-cell touch liquid crystal panel and the array substrate are provided. The structure of the touch screen of the array substrate is enhanced so as to reduce the width of the border of the liquid crystal panel. As such, the narrow border design may be realized.

In one aspect, an array substrate of in-cell touch liquid crystal panels includes: a glass substrate and at least one TFT, a common electrode layer, and at least one pixel electrode formed on the glass substrate in turn, a first insulation layer is arranged between the common electrode layer and the TFT, a passivation layer is arranged between the common electrode layer and the pixel electrode, and the pixel electrode electrically connects with the TFT via a first through hole; the common electrode layer includes a plurality of bar-shaped touch driving electrodes insulated from each other, the touch driving electrodes extend along a first direction, each of the touch driving electrodes includes a plurality of suspended electrodes arranged along the first direction, and the suspended electrodes are insulated from the touch driving electrode; a second insulation layer and a metal wiring layer are arranged between the common electrode layer and the passivation layer in sequence, wherein the second insulation layer includes a second through hole and a plurality of third through holes corresponding to each of the touch driving electrodes, each of the third through holes corresponds to one of the suspended electrodes within each of the touch driving electrodes, the metal wiring layer includes a plurality of driving electrode wirings, a plurality of suspended electrode wirings, and a plurality of touch sensing electrodes extending along the second direction, and the driving electrode wirings, the suspended electrode wirings, the touch sensing electrodes are insulated from each other; the driving electrode wirings correspond to the touch driving electrodes one by one, each of the driving electrode wirings electrically connects to one of the touch driving electrodes via the second through hole, and each of the suspended electrode wirings electrically connects to the suspended electrodes arranged along the second direction via the third through hole; and wherein the first direction is orthogonal to the second direction.

Wherein the driving electrode wirings span over all of the touch driving electrodes along the second direction, and a hollowed area is formed by hollowing out the projected area of the touch driving electrodes that have not electrically connected with the driving electrode wirings.

Wherein the driving electrode wirings, the suspended electrode wirings, and the touch sensing electrodes are arranged within a non-display area of the array substrate.

Wherein a width of the hollowed area is not smaller than the width of the driving electrode wirings.

Wherein the second through holes and/or the third through hole comprise a plurality of via holes.

Wherein each of the driving electrode wirings includes a plurality of electrically connected metal wirings, and each of the suspended electrode wirings includes a plurality of electrically connected metal wirings.

Wherein a larger number of metal wirings is configured with the driving electrode wirings that are located farther from a signal input end.

Wherein within the second insulation layer, n number of the third through holes are configured to be corresponding to each of the suspended electrodes, and the suspended electrodes arranged in one column along the second direction is configured with n number of the suspended electrode wirings over the top of the suspended electrodes, and n is an integer larger than one.

In another aspect, an in-cell touch liquid crystal panel includes a TFT array substrate, a color film substrate, and a liquid crystal layer between the TFT array substrate and the color film substrate. The TFT array substrate may be the above array substrate.

In view of the above, by changing the touch panel structure within the array substrate, the connection wirings of the touch driving electrodes have not occupied the border area of the panel. Thus, the width of the border of the liquid crystal panel is decreased so as to realize the narrow border design.

DETAILED DESCRIPTION OF THE EMBODIMENTS

Figure 1:
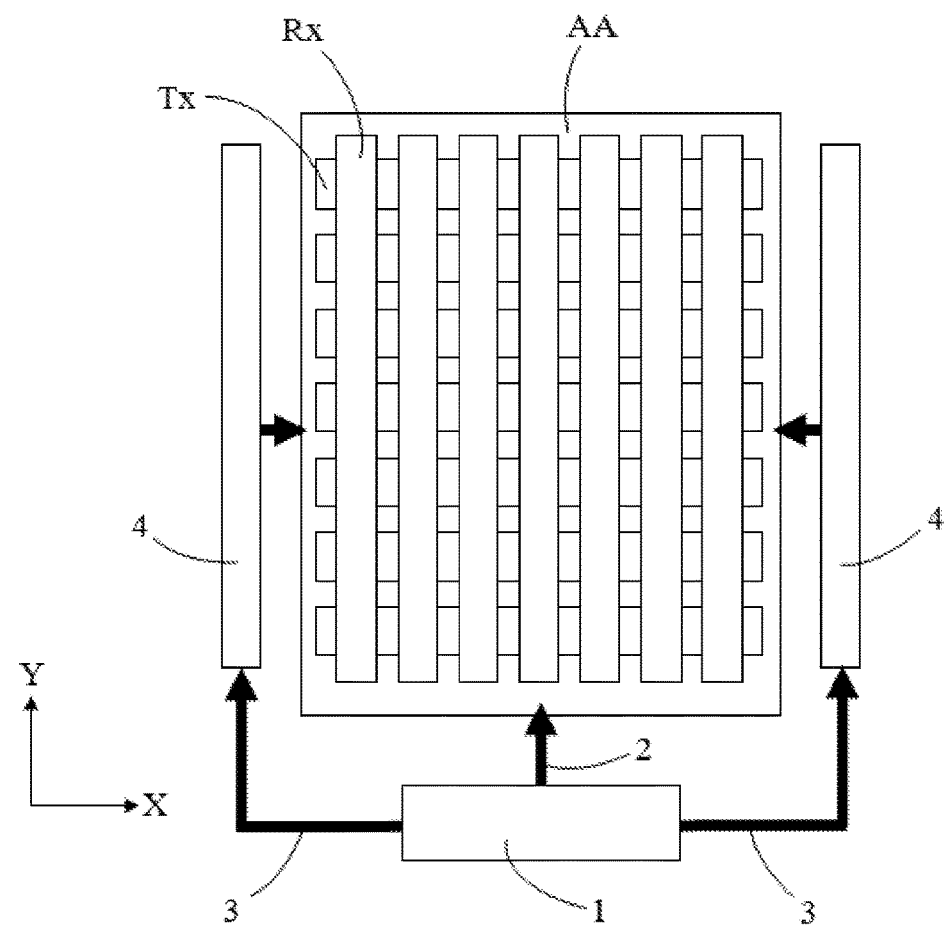
FIG. 1 is a schematic view of the conventional mutual-capacitive in-cell touch panel.

Embodiments of the invention will now be described more fully hereinafter with reference to the accompanying drawings, in which embodiments of the invention are shown.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
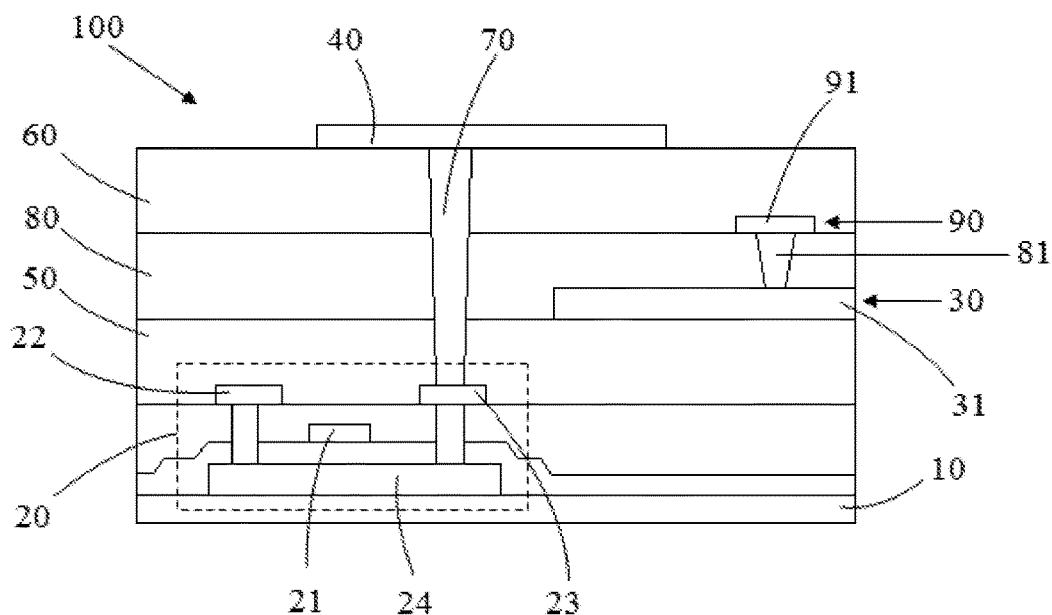
FIG. 2 is a schematic view of the array substrate of the in-cell touch liquid crystal panel in accordance with one embodiment.

Referring to FIGS. 2-5, in one embodiment, an in-cell touch liquid crystal panel includes an array substrate having a touch structure embedded therein. As shown in FIG. 2. The array substrate 100 includes a glass substrate 10 and at least one TFT 20, a common electrode layer 30, and a pixel electrode 40 formed on the glass substrate 10 in turn. A first insulation layer 50 is arranged between the common electrode layer 30 and the TFT 20. A passivation layer 60 is arranged between the common electrode layer 30 and the pixel electrode 40. The pixel electrode 40 electrically connects with the TFT 20 via a first through hole 70. Further, the a second insulation layer 80 and a metal wiring layer 90 is arranged between the common electrode layer 30 and the passivation layer 60 in sequence.

Figure 4:
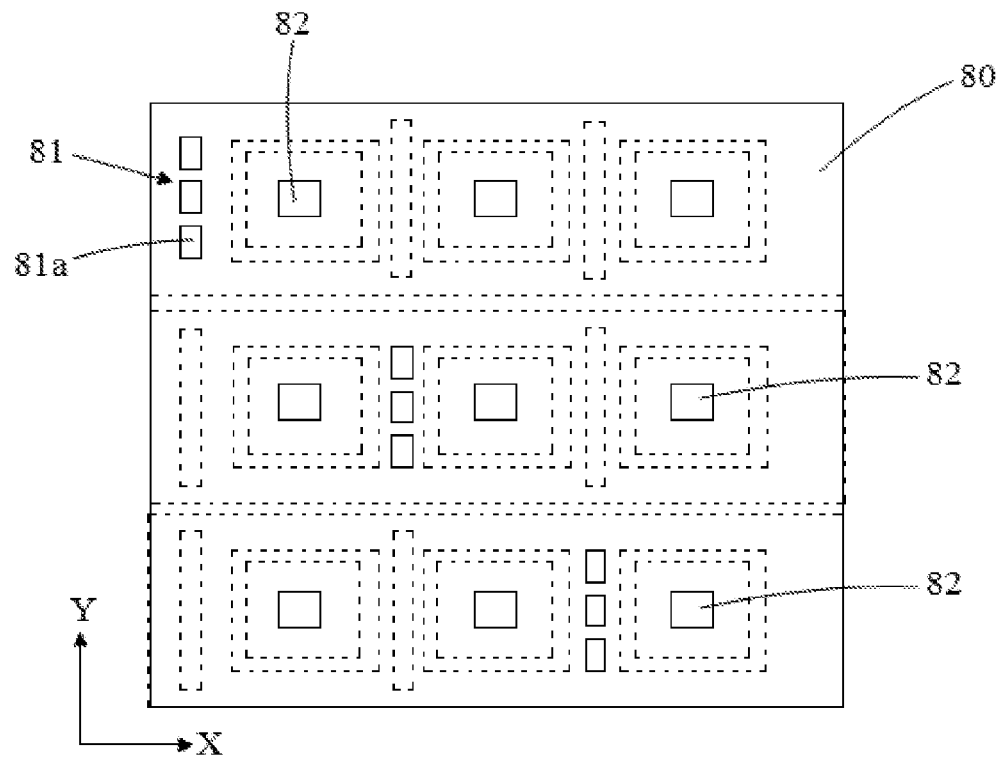
FIG. 4 is a schematic view of the second insulation layer in accordance with one embodiment.

The TFT 20 includes a gate 21, a source 22, a drain 23 and an active layer 24. In the embodiment, as shown in FIG. 2, the active layer 24 is arranged on the glass substrate 10, the gate 21 is arranged on the active layer 24, and the insulation layer is arranged between the gate 21 and the active layer 24. The source 22 and the drain 23 are arranged on the structure layer of the gate 21, and the insulation layer is arranged between the gate 21 and the source 22, the drain 23. The pixel electrode 40 connects to the drain 23 via the first through hole 70. In another example, the pixel electrode 40 connects to the source 22 via the first through hole 70. Only one TFT 20 and one pixel electrode 40 area shown in FIG. 2 as one example. It can be understood that there are a plurality of TFTs 20 arranged in a matrix and pixel electrodes 40. The array substrate 100 also includes a plurality of data lines and scanning lines. The scanning lines intersect with the data line to define the pixel cells. Each of the pixel cells include one TFT 20 and one pixel electrode 40 as shown in FIG. 4.

Figure 3:
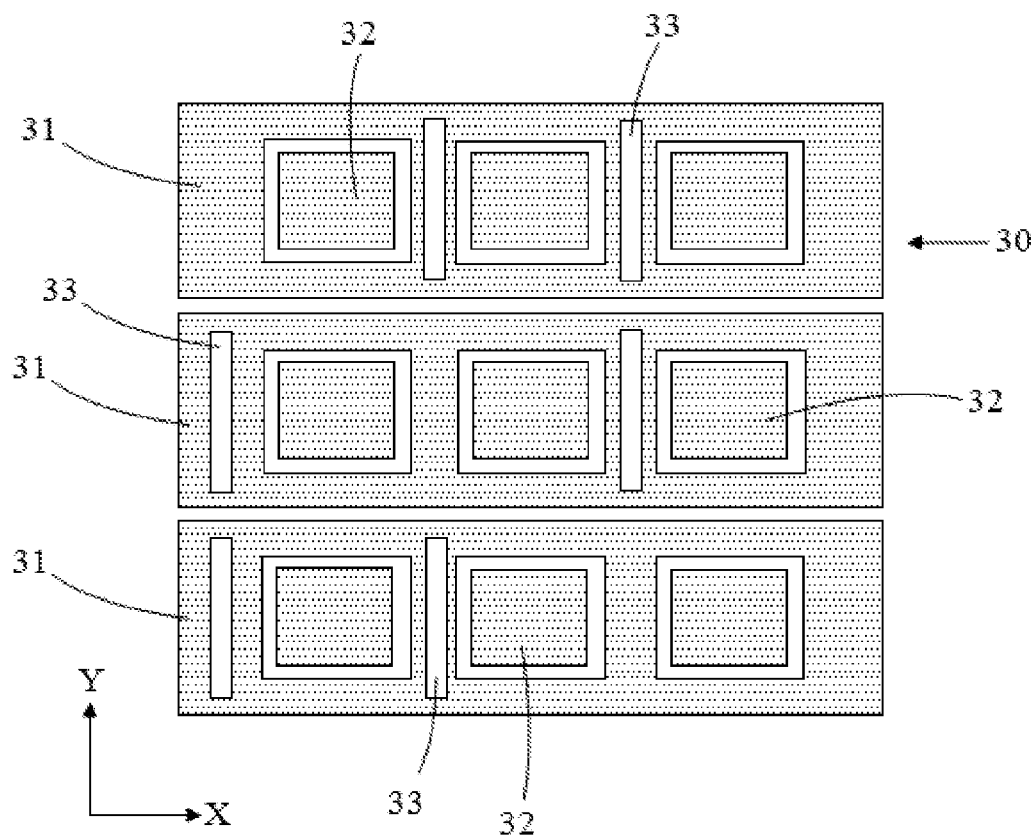
FIG. 3 is a schematic view of the common electrode layer in accordance with one embodiment.

In the embodiment, as shown in FIG. 3, the common electrode layer 30 includes a plurality of bar-shaped touch driving electrodes 31 insulated from each other. The touch driving electrodes 31 extend along a first direction, namely the X-direction in FIG. 3. In addition, the touch driving electrodes 31 are arranged along a second direction, namely, the Y-direction in FIG. 3. Within each of the touch driving electrodes 31, a plurality of suspended electrodes 32 are arranged along the first direction, and the suspended electrodes 32 are insulated from the touch driving electrode 31. Thus, within a whole area of the common electrode layer 30, the suspended electrodes 32 are arranged in a matrix, wherein the first direction is orthogonal to the second direction.

In the embodiment, referring to FIGS. 4 and 5, the portions defined by the dashed lines are the outlook of the common electrode layer 30 below the second insulation layer 80. As shown in FIG. 4, the second insulation layer 80 includes a second through hole 81 and a plurality of third through holes 82 corresponding to each of the touch driving electrodes 31. Each of the third through holes 82 corresponds to a plurality of suspended electrodes 32 within each of the touch driving electrodes 31. The metal wiring layer 90 includes a plurality of driving electrode wirings 91, a plurality of suspended electrode wirings 92, and a plurality of touch sensing electrodes 93 extending along the second direction, and the driving electrode wirings 91, the suspended electrode wirings 92, the touch sensing electrodes 93 are insulated from each other. The driving electrode wirings 91 corresponds to the touch driving electrodes 31 one by one. The driving electrode wirings 91 electrically connects one of the touch driving electrode 31 via the second through hole 81. Each of the suspended electrode wirings 92 electrically connects to the suspended electrodes 32 arranged along the second direction via the third through hole 82. It is to be noted that the second through hole 81 and the third through hole 82 may include a plurality of via holes to ensure the electrical connections between the wirings and the electrodes. For instance, as shown in FIG. 4, the second through hole 81 may include three via holes 81a.

With respect to the array substrate 100, when in a displaying process, an external control chip provides common voltage signals to the touch driving electrode 31 via the driving electrode wirings 91, and provides the common voltage signals to the suspended electrodes 32 via the suspended electrode wirings 92. In addition, the external control chip may provide the common voltage signals to the touch sensing electrodes 93 or no signals are provided to the touch sensing electrodes 93. Preferably, during the displaying process, the external control chip provides the common voltage signals to the touch sensing electrodes 93. During the touching sequence, the external control chip provides the touch driving signals to the touch driving electrode 31 via the driving electrode wirings 91. The suspended electrodes 32 have not provided any signals, and the touch sensing electrodes 93 receive the touch sensing signals.

By changing the touch panel structure within the array substrate, the connection wirings of the touch driving electrodes have not occupied the border area of the panel. Thus, the width of the border of the liquid crystal panel is decreased so as to realize the narrow border design.

Figure 5:
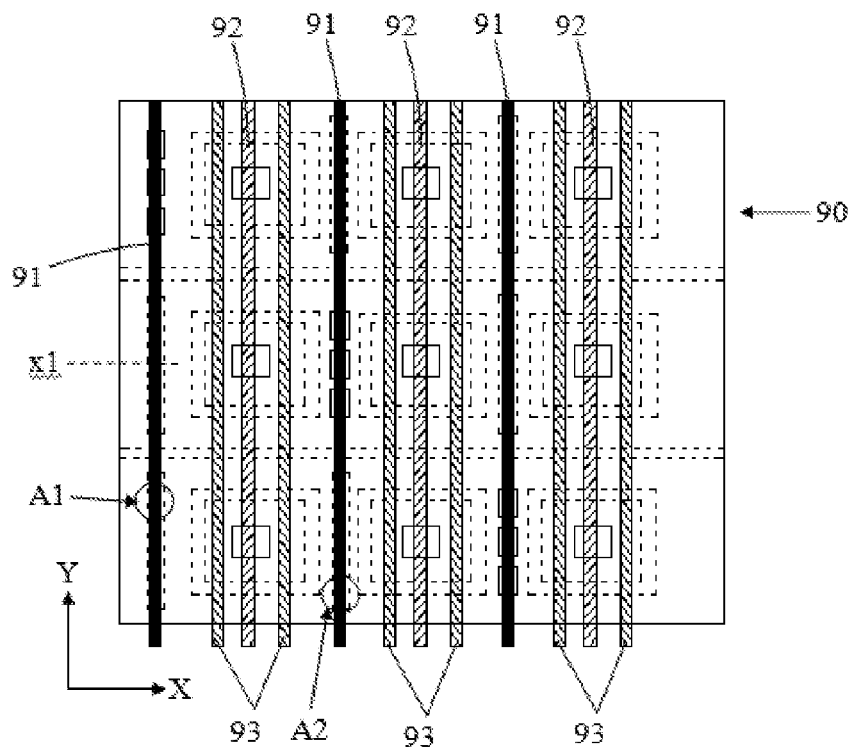
FIG. 5 is a schematic view of the metal wiring layer in accordance with one embodiment.

It is to be noted that FIGS. 3-5 only demonstrate that the common electrode layer 30 may include three touch driving electrodes 31, and each of the touch driving electrodes 31 includes three suspended electrodes 32. Such configuration is only taken as one example, and thus the present disclosure is not limited thereto. The number of the touch driving electrode 31 and the suspended electrodes 32 may be configured in accordance with real scenarios. That is, the number of the touch driving electrode 31 and the suspended electrodes 32 may be less than or more than the above configuration.

The number of the wirings within the metal wiring layer 90 be described hereinafter. The number of the driving electrode wirings 91 is the same with the number of the touch driving electrode 31. Each of the driving electrode wirings 91 corresponds to one touch driving electrode 31 electrically connected.

Figure 6:
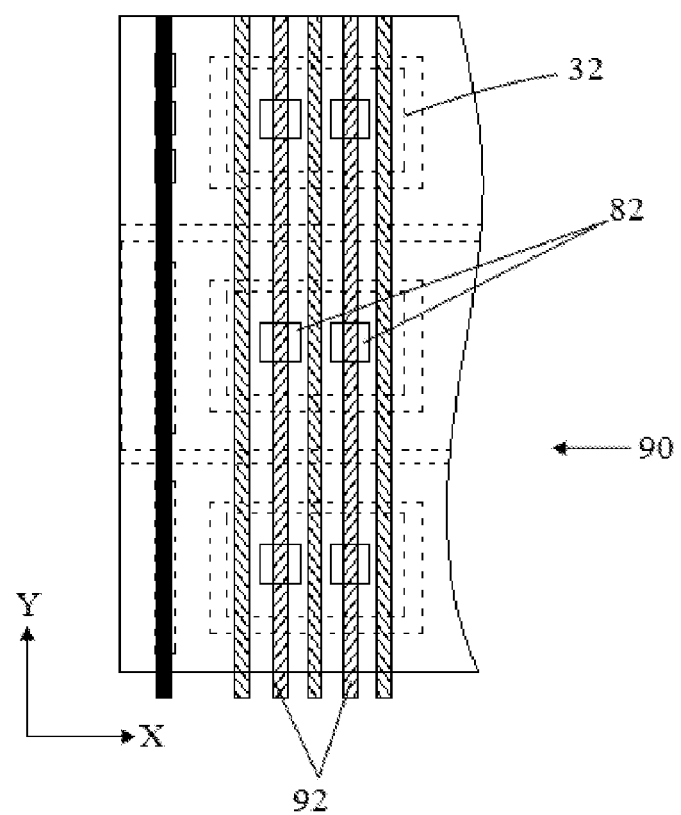
FIG. 6 is a schematic view of the metal wiring layer in accordance with another embodiment.

The number of the suspended electrode wirings 92 is determined by the number of the suspended electrodes 32. As shown in FIG. 5, at least one column of the suspended electrodes 32 is configured with one suspended electrode wirings 92. In another example, within the second insulation layer 80, n number of the third through holes 82 are configured to be corresponding to each of the suspended electrodes 32. The suspended electrodes 32 arranged in one column along the second direction is configured with n number of the suspended electrode wirings 92 over the top of the suspended electrodes 32, and the suspended electrode wirings 92 connect to the suspended electrodes 32, wherein n is the integer larger than one. As shown in FIG. 6, within the second insulation layer 80, two third through holes 82 are configured in accordance with each of the suspended electrodes 32. The suspended electrodes 32 of one column are configured with two suspended electrode wirings 92 over the top of the suspended electrodes 32, and the suspended electrode wirings 92 connect with the suspended electrodes 32.

The number of the touch sensing electrodes 93 is the largest one. Referring to FIG. 5, the metal wiring layer 90 covers the matrix of the pixel cells within the array substrate 100. With respect to the matrix of pixel cells, a rim of each of the pixel cells corresponds to the black matrix for shielding light. The location of each of the wirings within the metal wiring layer 90 centers in the location of the black matrix. In other words, the location of each of the wirings within the metal wiring layer 90 is arranged in a non-display area of the pixels in each columns of the array substrate 100. The Y-direction in FIG. 5 relates to a column direction of the pixel cell matrix. The wirings within the metal wiring layer 90 may be arranged between every two adjacent pixel cell columns. Thus, except for the locations for configuring the driving electrode wirings 91 and the suspended electrode wirings 92, the touch sensing electrodes 93 may be arranged in the remaining locations. Preferably, the touch sensing electrodes 93 are arranged in locations other than the areas having the driving electrode wirings 91 and the suspended electrode wirings 92 arranged thereon.

With respect to the length of the driving electrode wirings 91, as each of the driving electrode wirings 91 correspond to one touch driving electrode 31 electrically connected therewith, the length of the driving electrode wirings 91 may be configured accordingly. As shown in FIG. 5, the top-left area is a starting point, and the signals are inputted from upper ends of the wirings. A first, a second, and a third touch driving electrodes 31 are arranged along a top-down direction. A first, a second, a third driving electrode wirings 91 are arranged along a left-to-right direction. The first driving electrode wirings 91 may be configured to connect only to the first touch driving electrode 31, and thus is not extended to span the second and the third touch driving electrodes 31. The second driving electrode wirings 91 span the first touch driving electrode 31 and then connect to the second touch driving electrode 31, and is not extended to span the third touch driving electrode 31. The third driving electrode wirings 91 span the first and the second touch driving electrodes 31 and connect to the third touch driving electrode 31. It may he understood that in the above configuration, as the lengths of the driving electrode wirings 91 are different, the display performance may be affected due to the uniform transmission of the light beams.

In the embodiment, as shown in FIG. 5, the driving electrode wirings 91 span all of the touch driving electrodes 31 along the second direction. That is, the first driving electrode wirings 91 connect to the first touch driving electrode 31 and expend downward to span the second and the third touch driving electrodes 31. The second driving electrode wirings 91 span the first touch driving electrode 31 and connect to the touch driving electrode 31, and then span downward to the third touch driving electrode 31. The third driving electrode wirings 91 span the first and the second touch driving electrodes 31 and then connect to the third touch driving electrode 31. This may prevent from the optical issues caused by different lengths of the driving electrode wirings 91.

Figure 7:
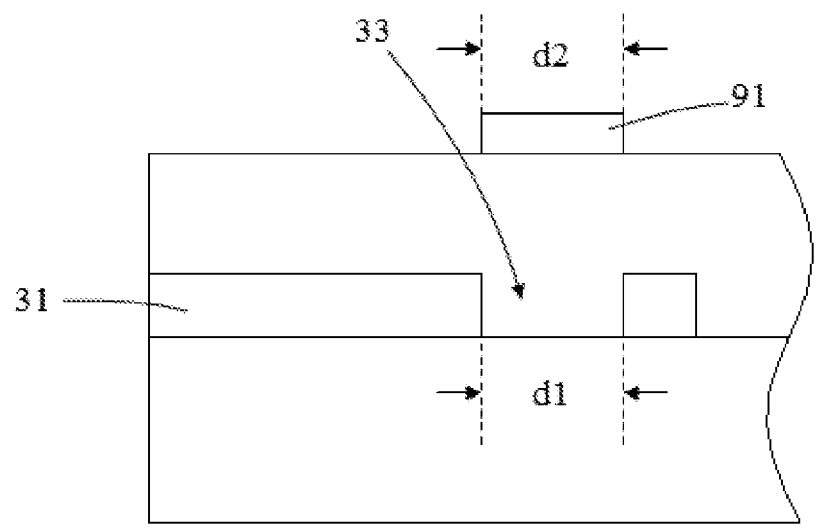
FIG. 7 is a cross-sectional view of the hollowed area along the line (x1) of FIG. 5.

However, as the driving electrode wirings 91 span over the touch driving electrode 31 that has not been connected therewith, the driving electrode wirings 91 may impact the signals of the touch driving electrode 31. In the embodiment, referring to FIGS. 3-5, and 7, FIG. 7 is a cross-sectional view of the FIG. 5 along the line "x1." A hollowed area 33 is formed by hollowing out the projected area of the touch driving electrodes 31 that have not electrically connected with the driving electrode wirings 91. Taking the first driving electrode wirings 91 as one example, the first driving electrode wirings 91 connects to the first touch driving electrode 31, and thus the hollowed area 33 is formed by hollowing out the projected area of the second and the third touch driving electrodes 31 with respect to the first driving electrode wirings 91. By configuring the hollowed area 33, the touch driving electrode 31 that has not connected to the driving electrode wirings 91 is prevented from being affected by the driving electrode wirings 91. In addition, as shown in FIG. 7, the width (d1) of the hollowed area 33 is not smaller than the width (d2) of the driving electrode wirings 91 to obtain a better effect.

Figure 8:
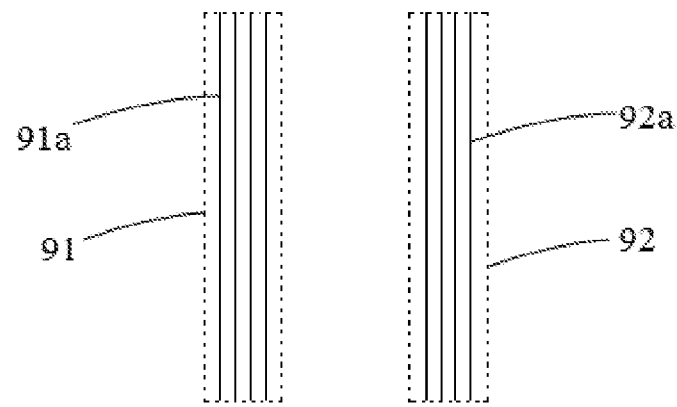
FIG. 8 is a schematic view of the driving electrode wirings and the suspended electrode wirings in accordance with one embodiment.
Figure 9:
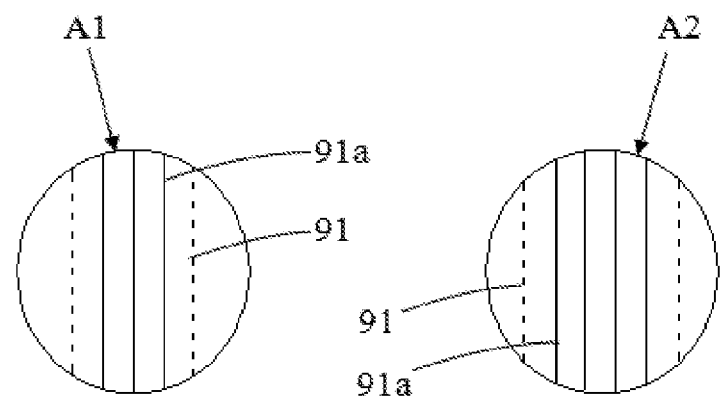
FIG. 9 is an enlarged view of the area A1 and A2 of FIG. 5.

In the embodiment, as shown in FIG. 8, each of the driving electrode wirings 91 include a plurality of electrically connected metal wirings 91a. each of the suspended electrode wirings 92 include a plurality of electrically connected metal wirings 92a. In addition, with respect to the driving electrode wirings 91 transmitting the touch driving signals, the transmitted distances of the different driving electrode wirings 91 are different, i.e., the distance from a signal input end to the corresponding suspended electrodes 32. In order to provide better matched impedance, a larger number of metal wirings 91a is configured for the driving electrode wirings 91 that are located farther from a signal input end. In an example, referring to FIGS. 5 and 9, if the first driving electrode wirings 91 include three metal wirings 91a, the second driving electrode wirings 91 may be configured to include four or more metal wirings 91a. Similarly, the number of the metal wirings 91a configured with the third driving electrode wirings 91 is larger than the number of the driving electrode wirings 91 configured with the second driving electrode wirings 91.

Figure 10:
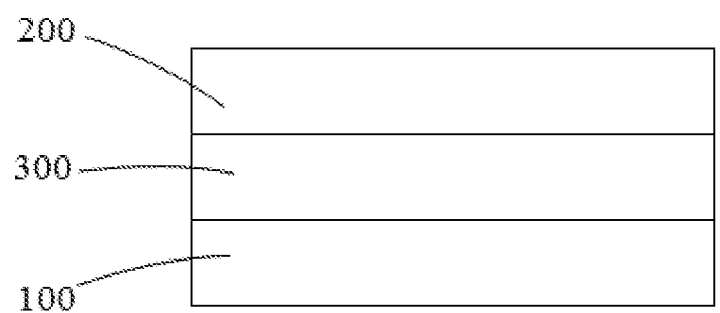
FIG. 10 is a schematic view of the in-cell touch liquid crystal panel in accordance with one embodiment.

In the embodiment, an in-cell touch liquid crystal panel, as shown in FIG. 10, includes the TFT array substrate 100 in the above embodiments. The in-cell touch liquid crystal panel also includes a color film substrate 200 opposite to the array substrate 100, and a liquid crystal layer 300 between the array substrate 100 and the color film substrate 200.

In view of the above, by changing the touch panel structure within the array substrate, the connection wirings of the touch driving electrodes have not occupied the border area of the panel. Thus, the width of the border of the liquid crystal panel is decreased so as to realize the narrow border design.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate of in-cell touch liquid crystal panels, comprising:
a glass substrate and at least one TFT, a common electrode layer, and at least one pixel electrode formed on the glass substrate in turn, a first insulation layer is arranged between the common electrode layer and the TFT, a passivation layer is arranged between the common electrode layer and the pixel electrode, and the pixel electrode electrically connects with the TFT via a first through hole;
the common electrode layer comprises a plurality of bar-shaped touch driving electrodes insulated from each other, the touch driving electrodes extend along a first direction, each of the touch driving electrodes comprises a plurality of suspended electrodes arranged along the first direction, and the suspended electrodes are insulated from the touch driving electrode;
a second insulation layer and a metal wiring layer are arranged between the common electrode layer and the passivation layer sequence, wherein the second insulation layer comprises a second through hole and a plurality of third through holes corresponding to each of the touch driving electrodes, each of the third through holes corresponds to one of the suspended electrodes within each of the touch driving electrodes, the metal wiring layer comprises a plurality of driving electrode wirings, a plurality of suspended electrode wirings, and a plurality of touch sensing electrodes extending along the second direction, and the driving electrode wirings, the suspended electrode wirings, the touch sensing electrodes are insulated from each other;
the driving electrode wirings correspond to the touch driving electrodes one by one, each of the driving electrode wirings electrically connects to one of the touch driving electrodes via the second through hole, and each of the suspended electrode wirings electrically connects to the suspended electrodes arranged along the second direction via the third through hole; and
wherein the first direction is orthogonal to the second direction.

2. The array substrate as claimed in claim I., wherein the driving electrode wirings span over all of the touch driving electrodes along the second direction, and a hollowed area is formed by hollowing out the projected area of the touch driving electrodes that have not electrically connected with the driving electrode wirings.

3. The array substrate as claimed in claim 2, wherein the driving electrode wirings, the suspended electrode wirings, and the touch sensing electrodes are arranged within a non-display area of the array substrate.

4. The array substrate as claimed in claim 2, wherein a width of the hollowed area is not smaller than the width of the driving electrode wirings.

5. The array substrate as claimed in claim 3, wherein a width of the hollowed area is not smaller than the width of the driving electrode wirings.

6. The array substrate as claimed in claim 1, wherein the second through holes and/or the third through hole comprise a plurality of via holes.

7. The array substrate as claimed in claim wherein each of the driving electrode wirings comprises a plurality of electrically connected metal wirings, and each of the suspended electrode wirings comprises a plurality of electrically connected metal wirings.

8. The array substrate as claimed in claim 7, wherein a larger number of metal wirings is configured with the driving electrode wirings that are located farther from a signal input end.

9. The array substrate as claimed in claim 1, wherein within the second insulation layer, n number of the third through holes are configured to be corresponding to each of the suspended electrodes, and the suspended electrodes arranged in one column along the second direction is configured with n number of the suspended electrode wirings over the top of the suspended electrodes, and n is an integer larger than one.

10. The array substrate as claimed in claim 2, wherein within the second insulation layer, n number of the third through holes are configured to be corresponding to each of the suspended electrodes, and the suspended electrodes arranged in one column along the second direction is configured with n number of the suspended electrode wirings over the top of the suspended electrodes, and n is an integer larger than one.

11. An in-cell touch liquid crystal panel, comprising:
a TFT array substrate, a color film substrate opposite to the TFT array substrate, and a liquid crystal layer between the TFT array substrate and the color film substrate, the TFT array substrate comprises:
a glass substrate and at least one TFT, a common electrode layer, and at least one pixel electrode formed on the glass substrate in turn, a first insulation layer is arranged between the common electrode layer and the TFT, a passivation layer is arranged between the common electrode layer and the pixel electrode, and the pixel electrode electrically connects with the TFT via a first through hole;
the common electrode layer comprises a plurality of bar-shaped touch driving electrodes insulated from each other, the touch driving electrodes extend along a first direction, each of the touch driving electrodes comprises a plurality of suspended electrodes arranged along the first direction, and the suspended electrodes are insulated from the touch driving electrode;
a second insulation layer and a metal wiring layer are arranged between the common electrode layer and the passivation layer in sequence, wherein the second insulation layer comprises a second through hole and a plurality of third through holes corresponding to each of the touch driving electrodes, each of the third through holes corresponds to one of the suspended electrodes within each of the touch driving electrodes, the metal wiring layer comprises a plurality of driving electrode wirings, a plurality of suspended electrode wirings, and a plurality of touch sensing electrodes extending along the second direction, and the driving electrode wirings, the suspended electrode wirings, the touch sensing electrodes are insulated from each other;
the driving electrode wirings correspond to the touch driving electrodes one by one, each of the driving electrode wirings electrically connects to one of the touch driving electrodes via the second through hole, and each of the suspended electrode wirings electrically connects to the suspended electrodes arranged along the second direction via the third through hole; and
wherein the first direction is orthogonal to the second direction.

12. The in-cell touch liquid crystal panel as claimed in claim 11, wherein the driving electrode wirings span over all of the touch driving electrodes along the second direction, and a hollowed area is formed by hollowing out the projected area of the touch driving electrodes that have not electrically connected with the driving electrode wirings.

13. The in-cell touch liquid crystal panel as claimed in claim 12, wherein the driving electrode wirings, the suspended electrode wirings, and the touch sensing electrodes are arranged within a non-display area of the array substrate.

14. The in-cell touch liquid crystal panel as claimed in claim 12, wherein a width of the hollowed area is not smaller than the width of the driving electrode wirings.

15. The in-cell touch liquid crystal panel as claimed in claim 13, wherein a width of the hollowed area is not smaller than the width of the driving electrode wirings.

16. The in-cell touch liquid crystal panel as claimed in claim 11 wherein the second through holes and/or the third through hole comprise a plurality of via holes.

17. The in-cell touch liquid crystal panel as claimed in claim 11, wherein each of the driving electrode wirings comprises a plurality of electrically connected metal wirings, and each of the suspended electrode wirings comprises a plurality of electrically connected metal wirings.

18. The in-cell touch liquid crystal panel as claimed in claim 17, wherein a larger number of metal wirings is configured with the driving electrode wirings that are located farther from a signal input end.

19. The in-cell touch liquid crystal panel as claimed in claim 11, wherein within the second insulation layer, n number of the third through holes are configured to be corresponding to each of the suspended electrodes, and the suspended electrodes arranged in one column along the second direction is configured with n number of the suspended electrode wirings over the top of the suspended electrodes, and n is an integer larger than one.

20. The in-cell touch liquid crystal panel as claimed in claim 12, wherein within the second insulation layer, n number of the third through holes are configured to be corresponding to each of the suspended electrodes, and the suspended electrodes arranged in one column along the second direction is configured with n number of the suspended electrode wirings over the top of the suspended electrodes, and n is an integer larger than one.

* * * * *